United States Patent
Guyer et al.

(10) Patent No.: US 12,281,552 B2
(45) Date of Patent: Apr. 22, 2025

(54) STRAIN DECOMPOSITION METHOD

(71) Applicants: Chevron U.S.A. Inc., San Ramon, CA (US); Triad National Security, LLC, Los Alamos, NM (US)

(72) Inventors: Robert A. Guyer, Los Alamos, NM (US); Timothy James Ulrich, II, Los Alamos, NM (US); James A. Ten Cate, Los Alamos, NM (US); Harvey Edwin Goodman, Houston, TX (US)

(*) Notice: Subject to any disclaimer, the term of this patent is extended or adjusted under 35 U.S.C. 154(b) by 957 days.

(21) Appl. No.: 17/371,566

(22) Filed: Jul. 9, 2021

(65) Prior Publication Data
US 2022/0010662 A1 Jan. 13, 2022

Related U.S. Application Data (60) Provisional application No. 63/049,981, filed on Jul. 9, 2020.

(51) Int. Cl.
*E21B 43/16* (2006.01)
*G06F 30/20* (2020.01)
*G06F 111/10* (2020.01)

(52) U.S. Cl.
CPC ............ *E21B 43/16* (2013.01); *G06F 30/20* (2020.01); *E21B 2200/20* (2020.05); *G06F 2111/10* (2020.01)

(58) Field of Classification Search
CPC ....... E21B 43/16; E21B 2200/20; G06F 30/20
USPC .......................................................... 703/10
See application file for complete search history.

(56) References Cited

U.S. PATENT DOCUMENTS

| | | | | |
|---|---|---|---|---|
| 9,164,192 | B2 * | 10/2015 | Maerten | G01V 20/00 |
| 10,082,601 | B2 * | 9/2018 | Stefani | G01V 20/00 |
| 10,684,392 | B2 * | 6/2020 | Mookanahallipatna Ramasesha | G01V 11/00 |
| 11,067,711 | B2 * | 7/2021 | Goodman | G01V 1/306 |
| 11,378,717 | B2 * | 7/2022 | Thore | G01V 1/306 |
| 2003/0114998 | A1 * | 6/2003 | Sinha | G01N 3/20 702/42 |
| 2003/0216894 | A1 * | 11/2003 | Ghaboussi | G05B 13/027 703/2 |
| 2005/0267695 | A1 * | 12/2005 | German | H03H 17/025 702/41 |
| 2008/0071505 | A1 * | 3/2008 | Huang | G01V 11/00 703/2 |
| 2009/0240478 | A1 * | 9/2009 | Searles | E21B 49/006 703/2 |
| 2011/0015907 | A1 | 1/2011 | Crawford | |

(Continued)

OTHER PUBLICATIONS

Aleshin et al. ("Characterization of hysteretic stress-strain behavior using the integrated Preisach density", International Journal of Non-Linear Mechanics 43 (2008) 151-163) (Year: 2008).*

(Continued)

*Primary Examiner* — Iftekhar A Khan
(74) *Attorney, Agent, or Firm* — Esplin & Associates, PC (57) ABSTRACT

Strain information may define strain of a material to stress. The strain of the material may be decomposed into classical strain, hysteretic strain, and residual strain. The classical strain, the hysteretic strain, and the residual strain may be used to facilitate modeling of the material. For example, the classical strain, the hysteretic strain, and the residual strain of a rock may be used to facilitate modeling of a subsurface region that includes the rock such as a reservoir simulation to predict hydrocarbon recovery.

18 Claims, 6 Drawing Sheets

(56) References Cited

U.S. PATENT DOCUMENTS

| | | | | |
|---|---|---|---|---|
| 2012/0075951 | A1* | 3/2012 | Johnson | G01V 1/46 367/32 |
| 2012/0075952 | A1* | 3/2012 | Johnson | G01V 1/46 367/35 |
| 2016/0011333 | A1* | 1/2016 | Maerten | G06Q 10/04 702/2 |
| 2017/0082779 | A1* | 3/2017 | Haukås | G01V 20/00 |
| 2017/0235016 | A1* | 8/2017 | Prioul | G01N 29/04 73/152.01 |
| 2018/0347320 | A1* | 12/2018 | Renaudeau | G06F 30/20 |
| 2018/0348400 | A1* | 12/2018 | Hsu | G01V 20/00 |
| 2019/0250295 | A1* | 8/2019 | Goodman | E21B 49/00 |
| 2019/0331820 | A1* | 10/2019 | Goodman | G01V 1/50 |
| 2020/0032623 | A1* | 1/2020 | McClure | E21B 49/00 |
| 2021/0018643 | A1* | 1/2021 | Ulrich, II | E21B 47/00 |
| 2022/0067247 | A1* | 3/2022 | Suresh | H01L 29/36 |
| 2022/0206184 | A1* | 6/2022 | Kumar | G01V 20/00 |
| 2022/0236445 | A1* | 7/2022 | Davies | E21B 47/005 |
| 2024/0280724 | A1* | 8/2024 | Hamid | G01V 20/00 |

OTHER PUBLICATIONS

Guo et al. ("Study of Mechanical Property of Rock under Uniaxial Cyclic Loading and Unloading", Hindawi Advances in Civil Engineering, 2018, pp. 1-6) (Year: 2018).*

Chen Xudong et al: 11 Dynamic tensile test of fly ash concrete under alternating tensile-compressive loading 11, Materials and Structures, Springer Netherlands, Dordrecht, vol. 51, No. 1, Jan. 24, 2018 (Jan. 24, 2018), pp. 1-12, XP036408369, ISSN: 1359-5997, DOI: 10.1617/S11527-018-1147-6 [retrieved on Jan. 24, 2018].

J. Riviere et al., Journal of Applied Physics "Pump and probe waves in dynamic acousto-elasticity: Comprehensivedescription and comparison with nonlinear elastic theories" 114, 054905 (2013).

K. Gao et al., Phys. Rev. Lett. "From Stress Chains to Acoustic Emission" 123, 048003 (2019).

K. R. McCall et al., Nonlinear Processes in Geophysics "Hysteresis, discrete Memory and nonlinear elastic wave propagation in rock: a new theoretical paradigm" 3, 89 (1996).

M. Boudjema et al., Nonlinear Processes in Geophysics, "Linear and nonlinear modulus surfaces in stress space, from stress-strain measurements on Berea sandstone" 10, 589 (2003).

P. Shokouhi et al., Appl. Phys. Lett. "Slow dynamics of consolidated granular systems: Multi-scale relaxation" 111, 251604 (2017).

Remillieux Marcel C. et al: 11 Propagation of a Finite-Amplitude Elastic Pulse in a Bar of Berea Sandstone: A Detailed Look at the Mechanisms of Classical Nonlinearity, Hysteresis, and Nonequilibrium Dynamics: Nonlinear Propagation of Elastic Pulse 11; Journal of Geophysical Research: Solid Earth, [Online] vol. 122, No. 11, Nov. 2017 (Nov. 2017), pp. 8892-8909, XP055867610, ISSN: 2169-9313, DOI: 10.1002/2017JB014258 Retrieved from the Internet: URL:https://api.wiley.com/onlinelibrary/tdm/vl/articles/10.1002%2F2017JB014258> [retrieved on Nov. 29, 2021].

T. J. Ulrich et al., The Journal of the Acoustical Society of America "Multimode nonlinear resonant ultrasound spectroscopy (NRUS): From one-dimensional to three-dimensional characterization of the hysteretic elastic nonlinearity" 138, 1886 (2015).

* cited by examiner

STRAIN DECOMPOSITION METHOD

CROSS-REFERENCE TO RELATED APPLICATION

The present application claims the benefit of U.S. Provisional Application No. 63/049,981, entitled "STRAIN DECOMPOSITION METHOD," which was filed on Jul. 9, 2020, the entirety of which is hereby incorporated herein by reference.

STATEMENT REGARDING FEDERAL RIGHTS

The United States government has certain rights in this invention pursuant to Contract No. 89233218CNA000001 between the United States Department of Energy and TRIAD National Security, LLC for the operation of Los Alamos National Laboratory.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

FIELD

The present disclosure relates generally to the field of decomposing material strain.

BACKGROUND

Strain measurement of a material may be used to perform modeling of the material. For example, strain measurement of a rock may be used to perform modeling of the rock, such as modeling of a subsurface region that includes the rock. Inaccurate estimation of the strain measurement may result in inaccurate modeling of the material. For example, inaccurate approximation of rock modulus may result in inaccurate prediction of hydrocarbon recovery from the subsurface region that includes the rock.

SUMMARY

This disclosure relates to decomposing material strain. Strain information and/or other information may be obtained. The strain information may define strain of a material to stress. The strain of the material may be decomposed into classical strain, hysteretic strain, residual strain, and/or other strain. Modeling of the material based on the classical strain, the hysteretic strain, the residual strain, and/or other strain may be facilitated.

A system for decomposing material strain may include one or more electronic storage, one or more processors and/or other components. The electronic storage may store strain information, information relating to strain of materials, information relating to decomposition of strain, information relating to classical strain, information relating to hysteretic strain, information relating to residual strain, information relating to modeling of materials, and/or other information.

The processor(s) may be configured by machine-readable instructions. Executing the machine-readable instructions may cause the processor(s) to facilitate decomposing material strain. The machine-readable instructions may include one or more computer program components. The computer program components may include one or more of a strain component, a decomposition component, a model component, and/or other computer program components.

The strain component may be configured to obtain strain information and/or other information. The strain information may define strain of a material to stress.

In some implementations, the material may include a rock.

In some implementations, the strain of the material to stress may include measurement of change in the strain of the material to change in stress. In some implementations, the change in stress may include one or more cycles of stress increase and stress decrease.

The decomposition component may be configured to decompose the strain of the material into multiple component strains. The decomposition component may be configured to decompose the strain of the material into classical strain, hysteretic strain, residual strain, and/or other strain.

In some implementations, decomposition of the strain of the material into the classical strain, the hysteretic strain, the residual strain, and/or other strain may include determination of the residual strain based on closure of a strain loop for the strain of the material and/or other information.

In some implementations, the decomposition of the strain of the material into the classical strain, the hysteretic strain, the residual strain, and/or other strain may further include determination of the hysteretic strain using a low order Preisach space model.

In some implementations, the decomposition of the strain of the material into the classical strain, the hysteretic strain, the residual strain, and/or other strain may further include determination of the classical strain based on removal of the residual strain and hysteretic strain from the strain of the material.

In some implementations, the decomposition of the strain of the material into the classical strain, the hysteretic strain, the residual strain, and/or other strain may further include representation of the classical strain using a third order polynomial.

The model component may be configured to facilitate modeling of the material based on the classical strain, the hysteretic strain, the residual strain, and/or other strain. In some implementations, facilitation of the modeling of the material based on the classical strain, the hysteretic strain, the residual strain, and/or other strain may include determination of one or more effective moduli of elasticity of the material for the modeling of the material based on the classical strain, the hysteretic strain, the residual strain, and/or other strain.

In some implementations, for the material including the rock, the modeling of the material may include simulation of a reservoir that includes the rock to predict hydrocarbon recovery from the reservoir. In some implementations, the simulation of the reservoir that includes the rock to predict the hydrocarbon recovery from the reservoir may include simulation of reservoir compressibility with depletion based on the classical strain, the hysteretic strain, the residual strain, and/or other strain.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to decomposing material strain. Strain information may define strain of a material to stress. The strain of the material may be decomposed into classical strain, hysteretic strain, and residual strain. The classical strain, the hysteretic strain, and the residual strain may be used to facilitate modeling of the material. For example, the classical strain, the hysteretic strain, and the residual strain of a rock may be used to facilitate modeling of a subsurface region that includes the rock such as a reservoir simulation to predict hydrocarbon recovery.

Figure 1:
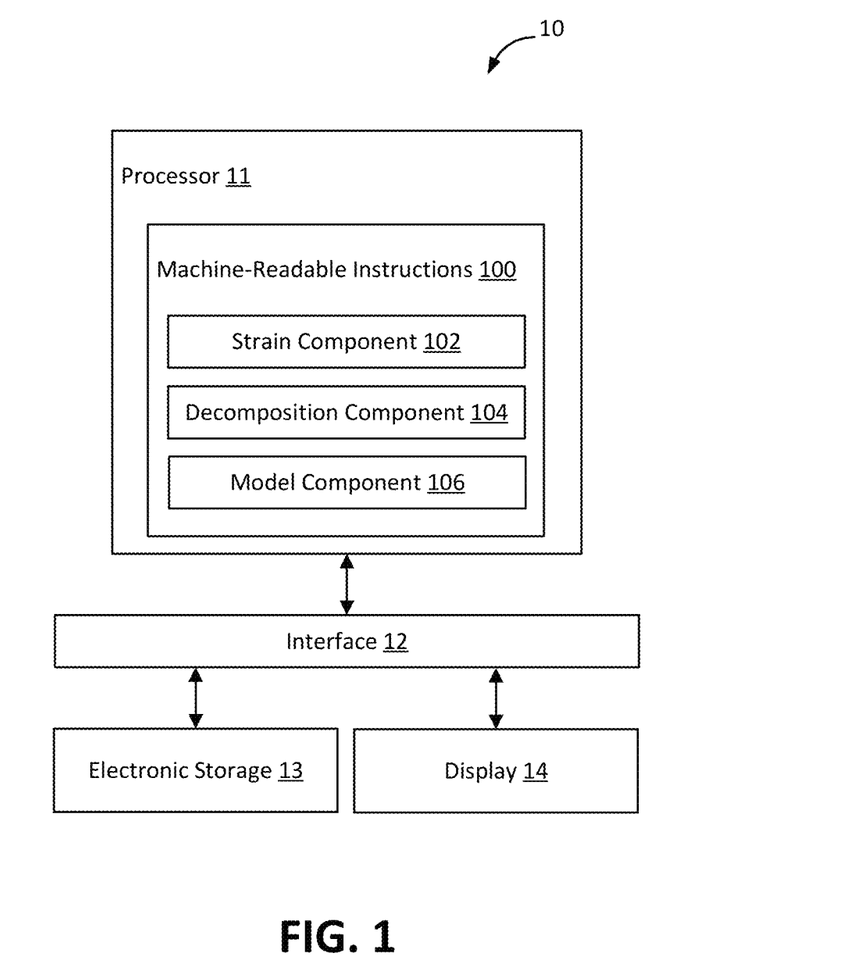
FIG. 1 illustrates an example system for decomposing material strain.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Strain information and/or other information may be obtained by the processor 11. The strain information may define strain of a material to stress. The strain of the material may be decomposed, by the processor 11, into classical strain, hysteretic strain, residual strain, and/or other strain. Modeling of the material based on the classical strain, the hysteretic strain, the residual strain, and/or other strain may be facilitated by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store strain information, information relating to strain of materials, information relating to decomposition of strain, information relating to classical strain, information relating to hysteretic strain, information relating to residual strain, information relating to modeling of materials, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present information relating to strain of materials, information relating to decomposition of strain, information relating to classical strain, information relating to hysteretic strain, information relating to residual strain, information relating to modeling of materials, and/or other information. For instance, the display 14 may present effective moduli of the material to be used on modeling and/or result of the modeling.

Application of stress to a material may induce strain within the material. Different characteristics of the material may result in different strain behavior of the material to stress. Accurate quantification of strain behavior in the material may be required to accurately simulate behavior of the material to stress. For example, rocks in a subsurface region (e.g., rocks in a reservoir) may include/be composed of granular materials that have quasi-static properties. The rocks may exhibit nonlinear response to stress. Accurate quantification of the nonlinear response of reservoir rock to stress may be required to accurately model the reservoir rock.

For instance, simulation may be performed to predict hydrocarbon recovery from the reservoir. Such simulation may incorporate the nonlinear strain response of the reservoir rock to stress. For example, such simulation may model what happens in the reservoir as the stress in the reservoir changes due to depletion and/or injection. To simulate the nonlinear strain response, strain measurement may be made on the rock (e.g., sample of rock extracted from the reservoir, rock that matches the rock in the reservoir). The rock may be placed under different strain to measure the strain in the rock.

Figure 3A:
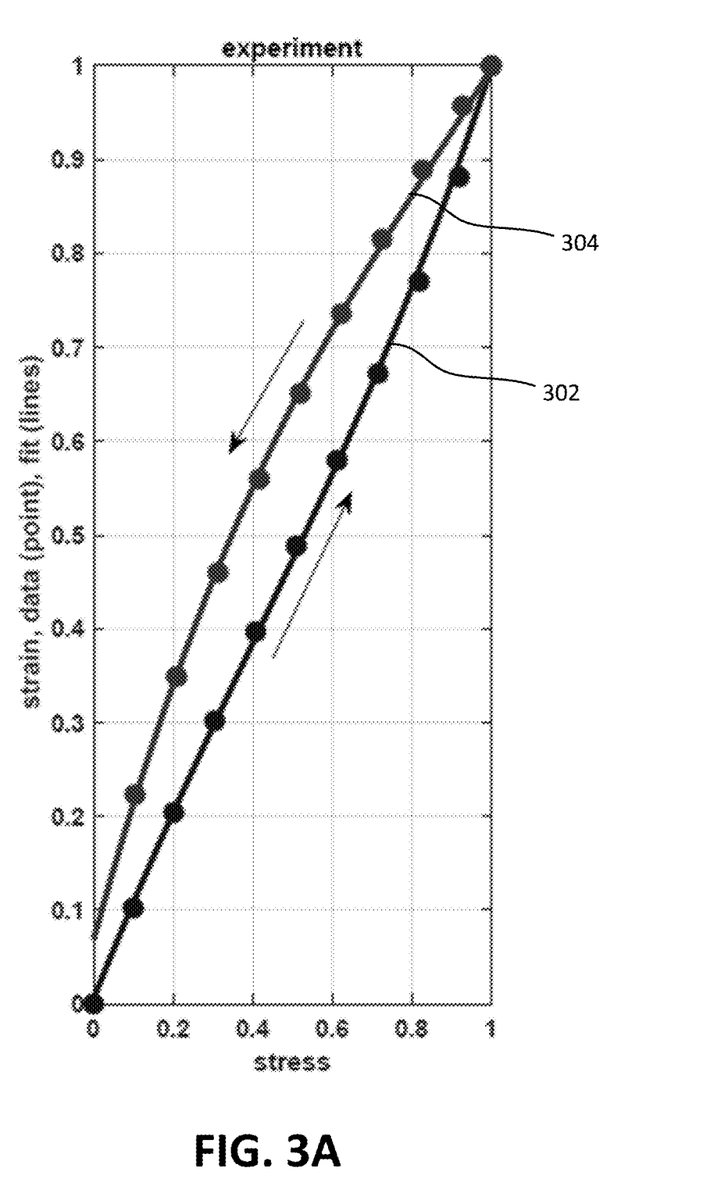
FIG. 3A illustrates example strain induced in a material by applying stress.

FIG. 3A illustrates example strain induced in a material by applying stress. For example, the strain shown in FIG. 3A may be the strain measured in rock under stress. The stress applied to the rock may be changed, and the change in the strain of the material may be measured as a function of the applied stress. In FIG. 3A, a curve 302 may represent values of the strain measured in the rock as the stress is increased, and a curve 304 may represent values of the strain measured in the rock as the stress is decreased. The change in strain within the rock may result in change in compressibility of the rock, and the change in compressibility of the rock may be used to model the reservoir.

Due to the nonlinearity of the strain-response in the rock, the strain measurement made in the rock may be estimated for use in modeling. For example, the strain measurement shown in FIG. 3A may utilize a best-fit line or an average line through the measured strain-stress points, which may then be used to approximate strain modulus to be used in modeling of the reservoir. However, such approximation may result in inaccurate modeling of the reservoir, leading to inaccurate prediction of hydrocarbon recovery from the reservoir.

Figure 3B:
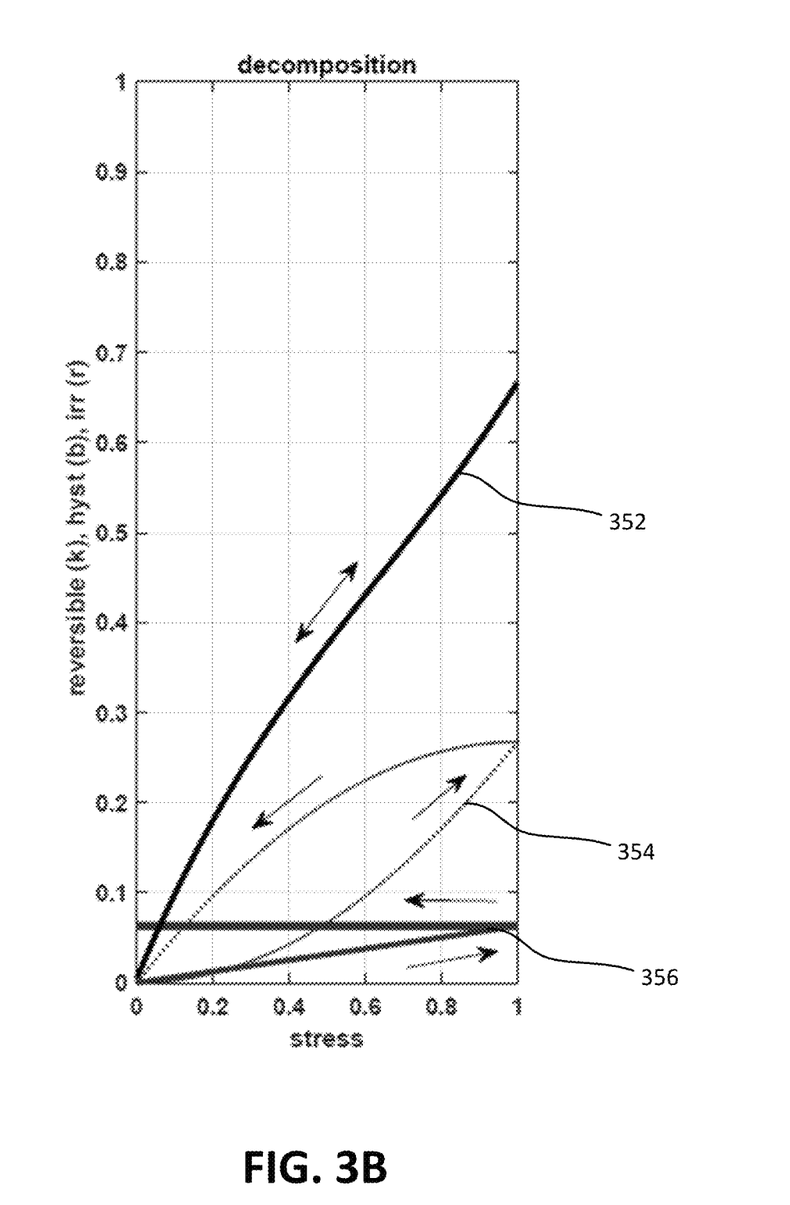
FIG. 3B illustrates example decomposition of the strain shown in FIG. 3A.

To provide more accurate measurement of the strain response in the material, the measured strain in the material may be decomposed into multiple component strains, such as classical strain (classical nonlinear strain), hysteretic strain (nonclassical hysteretic strain), residual strain, and/or other strain. FIG. 3B illustrates example decomposition of the strain shown in FIG. 3A. The strain may be decomposed into classical strain 352, hysteretic strain 354, and residual strain 356.

Different component strains may characterize different aspects of the strain in the material. Splitting different aspects of the strain in the material into different components may allow for more accurate measurement of the strain response in the material. The component strains may allow for more accurate modeling of the material. For instance, the component strain may be used to calculate one or more effective moduli of elasticity of the material (e.g., classical modulus, hysteretic modulus, residual modulus, composite module), and the effective moduli of elasticity of the material may be used to perform more accurate modeling of the material. For example, use of component strains as disclosed herein to define reservoir compressibility with depletion resulted in 20% difference in estimated ultimate recovery (EUR) of hydrocarbon from a reservoir over a thirty-year period from the EUR predicted using traditional strain approximation. Use of component strains as disclosed herein revealed that traditional strain approximation consistently underestimated stiffness (e.g., elastic moduli) of the rocks in the reservoir.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate decomposing material strain. The machine-readable instructions 100 may include one or more computer program components. The machine-readable instructions 100 may include a strain component 102, a decomposition component 104, a model component 106, and/or other computer program components.

The strain component 102 may be configured to obtain strain information and/or other information. Obtaining strain information may include one or more of accessing, acquiring, analyzing, determining, examining, identifying, generating, loading, locating, opening, receiving, retrieving, reviewing, selecting, storing, and/or otherwise obtaining the strain information. The strain component 102 may obtain strain information from one or more locations. For example, the strain component 102 may obtain strain information from a storage location, such as the electronic storage 13, electronic storage of a device accessible via a network, and/or other locations. The strain component 102 may obtain strain information from one or more hardware components (e.g., a computing device, a strain gauge, a strain measurement sensor) and/or one or more software components (e.g., software running on a computing device).

The strain information may define strain of a material to stress. The strain information may define how strain of a material changes to different stress. Strain of a material may refer to changes in/deformation of the material. Strain of a material may include elastic deformation, plastic deformation, and/or other deformation. The strain formation may define strain of a material to stress by including information that characteristics, describes, delineates, identifies, is associated with, quantifies, reflects, sets forth, and/or otherwise defines one or more of value, property, quality, quantity, attribute, feature, and/or other aspects of the strain of the material to stress. For example, the strain information may define strain of a material to stress by including information by including information that specifies strain within the material for different values of stress and/or different types of stress (e.g., uniaxial stress, shear stress) applied to the material. Other types of strain information are contemplated.

A material may refer to a type of matter. A material may refer to a single or a combination of elements, constituents, and/or substances. The strain information may be obtained for a material that have elastic properties, such as granular material, fractured material, and/or other material. For example, the material may include a rock (e.g., a rock from a subsurface region, such as a reservoir; a rock matching the type of rock found in a subsurface region), and the strain information may define strain of the rock to stress. While rocks are used as example material to which strain decomposition may be applied, this is merely as an example and is not meant to be limiting. Strain decomposition disclosed herein may be applied to other types of materials.

In some implementations, the strain of the material to stress may include measurement of change in the strain of the material to change in stress. For instance, the strain information for a rock may be obtained by placing the rock under stress, such as by placing the rock under confining pressure. The amount of stress on the rock may be changed (e.g., via change in the confining pressure), and the volumetric strain response of the rock to the confining pressure may be measured to generate the strain information for the rock.

Figure 4:
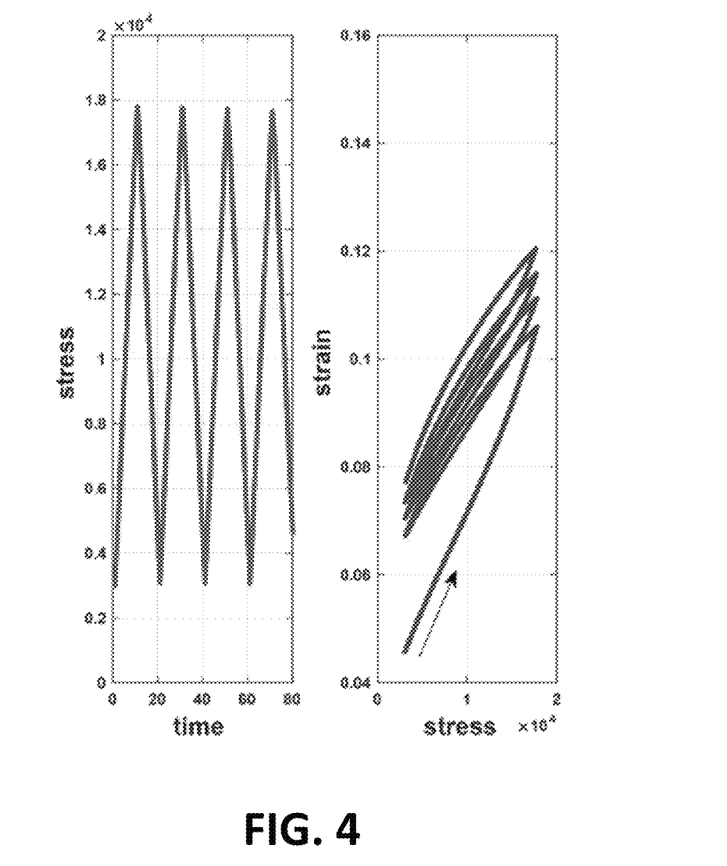
FIG. 4 Illustrates example cycles of stress on a material and resulting strain in the material.

In some implementations, the change in stress may include one or more cycles of stress increase and stress decrease. For example, to generate the strain information for the rock, the rock may be placed under multiple cycles of increasing and decreasing stress. FIG. 4 illustrates example cycles of stress on a material and resulting strain in the material. In FIG. 4, the material may be placed under four cycles of stress increase (loading) and stress decrease (unloading). The strain of the material may be measured during the four cycles of stress increase and stress decrease. Four identical cycles of stress may result in four open, hysteretic strain loops. The differences in the four open, hysteretic strain loops may indicate that the volumetric strain response of the rock is changing as stress is applied, indicating that the rock is experiencing plastic strain.

The decomposition component 104 may be configured to decompose the strain of the material into multiple component strains. Decomposing the strain of the material info multiple component strains may include separating different parts of the strain into the multiple component strains. Decomposing the strain of the material info multiple component strains may include determining contribution of individual component strains to the strain of the material. Combination of the multiple component strain may be equal to the strain of the material.

The decomposition component 104 may be configured to decompose the strain of the material into classical strain, hysteretic strain, residual strain, and/or other strain. The classical strain may refer to classical nonlinear strain. The classical strain may include the reversible and elastic part of the strain. The classical strain may include the component strain that is reversed when stress is removed from the material. The classical strain may include the component strain that is the same when stress is being increased as when the stress is being decreased.

For example, referring to FIG. 3B, the classical strain 352 may include the component strain of the strain shown in FIG. 3A that is reversed when stress is removed from the material. As shown in FIG. 3B, when stress is increased, the classical strain 352 is increased along the curve, and when the stress is decreased, the classical strain 352 is decreased along the same curve. Thus, the classical strain 352 is reversible and elastic.

The hysteretic strain may refer to nonclassical hysteretic strain. The hysteretic strain may include the reversible and plastic part of the strain. The hysteretic strain in the material may indicate that the material includes hysteretic elastic properties. The modulus of the material may change as a function of strain. Additionally, the modulus of the material may be dependent on the direction of strain change (e.g., loading vs unloading). The hysteretic strain may include the component strain that is removed when stress is removed from the material. The hysteretic strain may include the component strain that is different based on whether the strain is being increased or decreased.

For example, referring to FIG. 3B, the hysteretic strain 354 may include the component strain of the strain shown in FIG. 3A that is removed when stress is removed from the material. The hysteretic nature of the strain may result in different strain response in the material based on whether the stress is being increased or decreased. As shown in FIG. 3B, when stress is increased, the hysteretic strain 354 may increase along a lower part of the curve, and when the stress is decreased, the hysteretic strain 354 may decrease along an upper part of the curve.

The residual strain may refer to the part of the strain that remains after stress is removed. The residual strain may refer to the irreversible and plastic part of the strain. The residual strain in the material may include deformation within the material that is not reversed/removed when the stress is removed. For example, the residual strain in the material may include damage to the material (e.g., new damage in the material, change to existing damage in the material).

For example, referring to FIG. 3B, the residual strain 356 may include the non-reversible/removable part of the strain shown in FIG. 3A. As shown in FIG. 3B, when stress is increased, the residual strain 356 is increased, and when the stress is decreased, the residual strain 356 remains the same and does not return to zero. The residual strain may change strain response of the material when cycles of strain is applied to the materials. For example, referring to FIG. 4, the residual strain may cause changes in volumetric strain response of the rock to four cycles of strain.

In some implementations, decomposition of the strain of the material into the classical strain, the hysteretic strain, the residual strain, and/or other strain may include determination of the residual strain based on closure of a strain loop for the strain of the material and/or other information. Closure of a strain loop for the strain of the material may include determination of difference between (1) the strain before stress is applied and (2) strain after the stress is applied and removed. The difference in the strain of the material may indicate how much residual strain was experienced by the material due to stress. That is, residual strain may cause the strain loop to not return to unity when stress is removed, and the residual strain may be determined based on how much strain is remaining in the material/how much strain would have to be accounted for to close the strain loop.

In some implementations, the decomposition of the strain of the material into the classical strain, the hysteretic strain, the residual strain, and/or other strain may include determination of the hysteretic strain using a low order Preisach space model. A parametrized plastic strain model based on a Preisach space picture of reversible and plastic component of strain may be used. The model parameters may be identified using a variational principle. Use of other models and other principles for the determination of the hysteretic strain is contemplated.

In some implementations, the decomposition of the strain of the material into the classical strain, the hysteretic strain, the residual strain, and/or other strain may include determination of the classical strain based on removal of the residual strain and hysteretic strain from the strain of the material. That is, once the contribution of the residual strain and the hysteretic strain on the strain of the material is determined, the residual strain and the hysteretic strain may be removed/subtracted from strain of the material to determine the classical strain.

Figure 5:
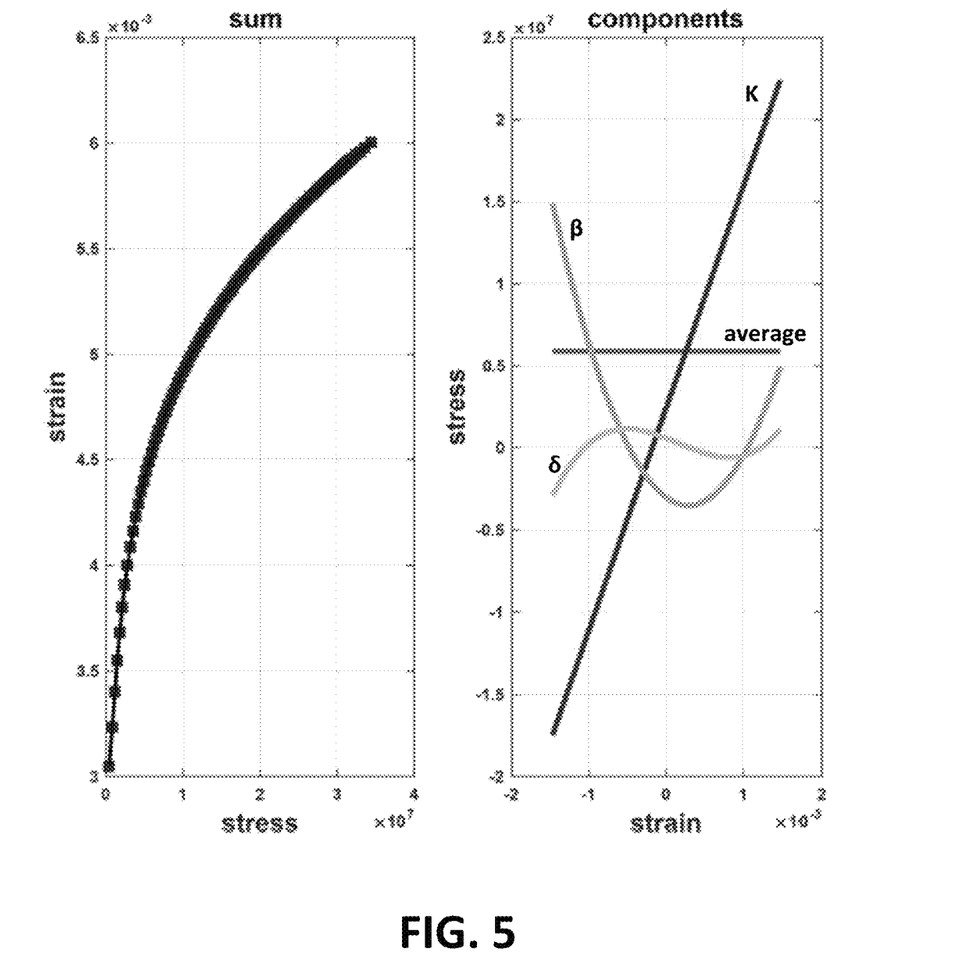
FIG. 5 illustrates example decomposition of classical strain.

In some implementations, the decomposition of the strain of the material into the classical strain, the hysteretic strain, the residual strain, and/or other strain may further include representation of the classical strain using a third order polynomial. That classical strain may include a curve of strain, and the characteristics of the curve may be represented using a third order polynomial. The constant and the coefficients (linear elastic constant $\kappa$, cubic anharmonic constant $\beta$, quartic anharmonic constant $\delta$) of the third order polynomial may be determined based on the characteristics of the curve. FIG. 5 illustrates example decomposition of classical strain, with the left plot showing classical strain and the right plot showing the classical strain decomposed into different curves of the third-order polynomial.

To decompose the strain of the material into multiple component strains, a stress-strain loop may be considered as having two parts: strain on stress increase ($\epsilon_\uparrow^x$) and strain on stress decrease ($\epsilon_\downarrow^x$). The superscript x (experimental) may indicate the measured strain on stress increase/decrease. These stress parts may be expressed as:

$$\epsilon_\uparrow^x = \epsilon_\uparrow^r + \epsilon_\uparrow^P \tag{1}$$

$$\epsilon_\downarrow^x = \epsilon_\downarrow^r + \epsilon_\downarrow^P \tag{2}$$

In the above, the strain from reversible elastic elements ($\epsilon_*^r$) may be the same in both the stress increase and the stress decrease, while the plastic strain ($\epsilon_*^P$) may be different in the stress increase and the stress decrease. Using a parametrized model for the plastic strain, the stresses may be expressed as:

$$\epsilon_\uparrow^r - \epsilon_\downarrow^r = (\epsilon_\uparrow^x - \epsilon_\downarrow^x) - (\epsilon_\uparrow^P - \epsilon_\downarrow^P) = 0 \tag{3}$$

where the zero on the right hand side obtains if the model for the plastic strain is exact.

For each stress-strain loop, the model for the plastic strain may be inserted into the objective function:

$$\varepsilon = \int d\sigma [(\epsilon_\uparrow^x - \epsilon_\downarrow^x) - (\epsilon_\uparrow^P - \epsilon_\downarrow^P)]^2 \tag{4}$$

where the integration on d$\sigma$, the confining pressure, may be from the lowest confining pressure to the highest confining pressure, and $\epsilon_\uparrow^x$ and $\epsilon_\downarrow^x$ may be the measured strains. The parameters in the model for the plastic strain may be determined from varying E.

To model the plastic strain, the measured stress and strain may be shifted and scaled to fit in a reduced space, $0 \leq S \leq 1$ and $0 \leq e \leq 1$, ($\sigma \rightarrow S$ and $\epsilon \rightarrow e$). A low order Preisach space model may be used for the plastic strain to find:

$$\epsilon_\uparrow^P \rightarrow e_P(S_\uparrow) = \frac{\alpha^*}{2} S^2 + \rho^* S, \tag{5}$$

$$\epsilon_\downarrow^P \rightarrow e_P(S_\downarrow) = \alpha^* S\left(1 - \frac{S}{2}\right) + \rho^*$$

where $\alpha^*$ is a uniform Preisach space density (of reversible plastic elements) and $\rho^*$ is a measure of the number of irreversible plastic elements activated by each increment of stress. The constants $\alpha^*$ and $\rho^*$ may be the variational parameters in the model of plastic strain in the reduced space.

The following may be noted:

$$e_P(S_\uparrow = 0) = 0, \ e_P(S_\uparrow = 1) = \frac{\alpha^*}{2} + p^*, \quad (7)$$

$$e_P(S_\downarrow = 1) = \frac{\alpha^*}{2} + p^*, \ e_P(S_\downarrow = 0) = p^*.$$

Equation (4) may be rewritten in the form:

$$\varepsilon = \int_0^1 [(e_\uparrow^x - e_P(S_\uparrow)) - (e_\downarrow^x - e_P(S_\downarrow))]^2 dS, \quad (8)$$

Equations (5) and (6) may be used to define:

$$De^x(S) = e_\uparrow^x - e_\downarrow^x, \ De_P = e_P(S_\uparrow) - e_P(S_\downarrow) = \alpha^*S(S-1) + p^*(1-S) = \alpha^*A(S) + p^*B(S), \quad (9)$$

and obtain:

$$\varepsilon(\alpha^*, p^*) = \int_0^1 [(De^x(S) - \alpha^*A(S) - p^*B(S)]^2 dS, \quad (10)$$

Left hand side of equation (10) may be varied with respect to $\alpha^*$ and $\rho^*$ to result in:

$$\int_0^1 [(De^x(S) - \alpha^*A(S) - p^*B(S)]A(S)dS = 0 \quad (11)$$

$$\int_0^1 [(De^x(S) - \alpha^*A(S) - p^*B(S)]B(S)dS = 0. \quad (12)$$

and obtain:

$$\begin{pmatrix} \langle A|A \rangle & \langle A|B \rangle \\ \langle B|A \rangle & \langle B|B \rangle \end{pmatrix} \begin{pmatrix} \alpha^* \\ p^* \end{pmatrix} = \begin{pmatrix} \langle De^*(S)|A \rangle & 0 \\ 0 & \langle De^*(S)|B \rangle \end{pmatrix} \begin{pmatrix} \alpha^* \\ p^* \end{pmatrix}, \quad (13)$$

where:

$$\int_0^1 f(S)g(S) \ dS \langle f|g \rangle. \quad (14)$$

The constants $\alpha^*$ and $\rho^*$, parametrizing the plastic strain, may depend on the projection of A(S) and B(S) onto $De^x(S)$, the difference between the measured up and down stress-strain curves.

The model component 106 may be configured to facilitate modeling of the material based on the classical strain, the hysteretic strain, the residual strain, and/or other strain. The model component 106 may facilitate use of the classical strain, the hysteretic strain, the residual strain to perform modeling of the material. The model component 106 may facilitate use of information determined from the classical strain, the hysteretic strain, the residual strain to perform modeling of the material. In some implementations, facilitating modeling of the material based on the classical strain, the hysteretic strain, the residual strain may include (1) presenting the classical strain, the hysteretic strain, and the residual strain on a display, (2) presenting information determined from the classical strain, the hysteretic strain, and the residual strain on a display, (3) providing the classical strain, the hysteretic strain, and the residual strain to one or more modeling processes, (4) providing information determined from the classical strain, the hysteretic strain, and the residual strain to one or more modeling processes, (5) performing modeling of the material based on the classical strain, the hysteretic strain, and the residual strain, (6) performing modeling of the material based on the information determined from the classical strain, the hysteretic strain, and the residual strain, and/or other facilitating of the modeling of the material.

Modeling of the material may include act of creating a computer simulation of the material. Modeling of the material may be performed using one or more computer devices. Modeling of the material may include simulation of the material to one or more static conditions and/or one or more dynamic conditions. Modeling of the material may include simulation of the material itself and/or simulation of other things surrounding/interacting with the material.

For example, the material may include rock, and the modeling of the material may include simulation of a reservoir that includes the rock. The simulation of the reservoir may include prediction of how the reservoir behaviors and/or changes due to one or more static conditions and/or one or more dynamic conditions. For example, simulation of the reservoir may utilize the classical strain, the hysteretic strain, and the residual strain on a display (and/or information determined from the classical strain, the hysteretic strain, and the residual strain) to predict hydrocarbon recovery from the reservoir (e.g., prediction of estimated ultimate recovery from the reservoir).

In some implementations, the simulation of the reservoir that includes the rock to predict the hydrocarbon recovery from the reservoir may include simulation of reservoir compressibility with depletion based on the classical strain, the hysteretic strain, the residual strain, and/or other strain. The classical strain, the hysteretic strain, and the residual strain (or information determined from the classical strain, the hysteretic strain, and the residual strain) may be used to define how compressibility of the reservoir (compressibility of rock within the reservoir) changes as hydrocarbons are extracted from the reservoir. As the reservoir is depleted, compaction/porosity loss of the rock volume is diminished, which results in less compressible reservoir. The classical strain, the hysteretic strain, and the residual strain may be used to accurately define changes in reservoir compressibility. For example, reservoir compressibility defined using the classical strain, the hysteretic strain, and the residual strain may be more accurate than reservoir compressibility defined using traditional strain approximation.

In some implementations, facilitation of the modeling of the material based on the classical strain, the hysteretic strain, the residual strain, and/or other strain may include determination of one or more effective moduli of elasticity of the material for the modeling of the material based on the classical strain, the hysteretic strain, the residual strain, and/or other strain. An effective modulus of elasticity of the material may refer to a value of modulus that is representative of one or more elastic properties of the material. For example, a single effective modulus of elasticity may be determined to represent some or all of the classical strain, the hysteretic strain, and the residual strain of the material. For instance, the classical strain, the hysteretic strain, and the residual strain of the material may be used to calculate one or more effective moduli at specific stress conditions. History of stress conditions may be taken into account in determining the one or more effective moduli. The value of the effective moduli may be determined for different stress conditions. For example, individually calculated effective moduli may include instantaneous effective moduli, which may change for different stress conditions. The classical strain, the hysteretic strain, and the residual strain may be used to determine the instantaneous effective moduli at any point in the stress loop. The values of the instantaneous effective moduli may be used to accurately model the material. Information used in the modeling of the material may include the actual values of the effective moduli, equations that incorporate the classical strain, the hysteretic strain, and the residual strain to dynamically determine the values of the effective moduli, and/or other information.

To determine effective modulus, strain may be described as a sum of two components: the background (b) strain and the hysteretic (H) strain. The strain may be represented as a function of stress (σ):

$$\epsilon(\sigma) = \epsilon_b(\sigma) + \epsilon_H(\sigma) \quad (15)$$

The effective modulus of the material may be determined using the change in strain produced by an infinitesimal change in stress:

$$K(\sigma) = \frac{d\sigma}{d\epsilon} \quad (16)$$

which may be represented as:

$$\frac{1}{K(\sigma)} = \frac{1}{K(\sigma)_b} + \frac{1}{K(\sigma)_H}, \quad (17)$$

$$\text{where } \frac{1}{K(\sigma)_b} = \frac{d\epsilon_b}{d\sigma}, \frac{1}{K(\sigma)_H} = \frac{d\epsilon_H}{d\sigma} \quad (18)$$

The direction in which the stress was produced (by increase, by decrease) may be taken into account to utilize equation (17) and arrive at:

$$\frac{1}{K(\sigma)} = \frac{1}{K(\sigma)_b} + \frac{1}{K(\sigma)_H^\uparrow} \quad (19)$$

where stress is increasing (arrive at the stress value from below), and $$\frac{1}{K(\sigma)} = \frac{1}{K(\sigma)_b} + \frac{1}{K(\sigma)_H^\downarrow} \quad (20)$$

where stress is decreasing (arrive at the stress value from above).

In some implementations, the effective modulus as defined in equations (19) and (20) may be determined by taking the numerical derivatives of empirical strain-increase and strain-decrease curves. These curves may be fit to low-order polynomials, enabling efficient calculation of their derivatives.

For example, to determine the effective modulus for a given stress σ that is arrived at via increase is stress, K(σ) may be indirectly determined by taking the derivative of equation (15), and arrive at:

$$\frac{\partial \epsilon(\sigma)}{\partial \sigma} = \frac{\partial \epsilon_b(\sigma)}{\partial \sigma} + \frac{\partial \epsilon_H^\uparrow(\sigma)}{\partial \sigma}. \quad (21)$$

Using a third order polynomial expression of background stress, the following expression may be derived:

$$K_b = K_r[1 + 2\beta_r(\Delta\epsilon) + 3\delta_r(\Delta\epsilon)^2] \quad (22)$$

The hysteretic component may be expressed as following:

$$\frac{1}{K_H^\uparrow(\sigma)} = \frac{\alpha^* Y_m}{W_m^2} \sigma. \quad (23)$$

Incorporating equations (22) and (23) into equation (19) results in the following expression for effective modulus when the stress is reached from below:

$$\frac{1}{K_\uparrow(\sigma)} = \left( \frac{1}{K_r[1 + 2\beta_r(\Delta\epsilon) + 3\delta_r(\Delta\epsilon)^2]} + \frac{\alpha^* Y_m}{W_m} \frac{\sigma}{W_m} \right) \quad (24)$$

When the stress is reached from above (by decreasing stress value), the effective modulus may be expressed as:

$$\frac{1}{K_\downarrow(\sigma)} = \left( \frac{1}{K_r[1 + 2\beta_r(\Delta\epsilon) + 3\delta_r(\Delta\epsilon)^2]} + \frac{\alpha^* Y_m}{W_m} \left[1 - \frac{\sigma}{W_m}\right] \right) \quad (25)$$

Equations (24) and (25) relate to two particular stress protocols. These expressions may be generalized for stress protocol (Σ):

$$\frac{1}{K_\Sigma(\sigma)} = \left( \frac{1}{K_r[1 + 2\beta_r(\Delta\epsilon) + 3\delta_r(\Delta\epsilon)^2]} + \frac{1}{K_H(\sigma \mid \Sigma)} \right) \quad (26)$$

Once the stress protocol is specified, the effective modulus may be determined by following the reversible plastic strain elements through the stress protocol (e.g., finding $K_H(\sigma|\Sigma)$).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). A machine-readable medium may include non-transitory computer-readable medium. For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11. The system 10 may be implemented in a single computing device, across multiple computing devices, in a client-server environment, in a cloud environment, and/or in other devices/configuration of devices. The system 10 may be implemented using a computer, a desktop, a laptop, a phone, a tablet, a mobile device, a server, and/or other computing devices.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
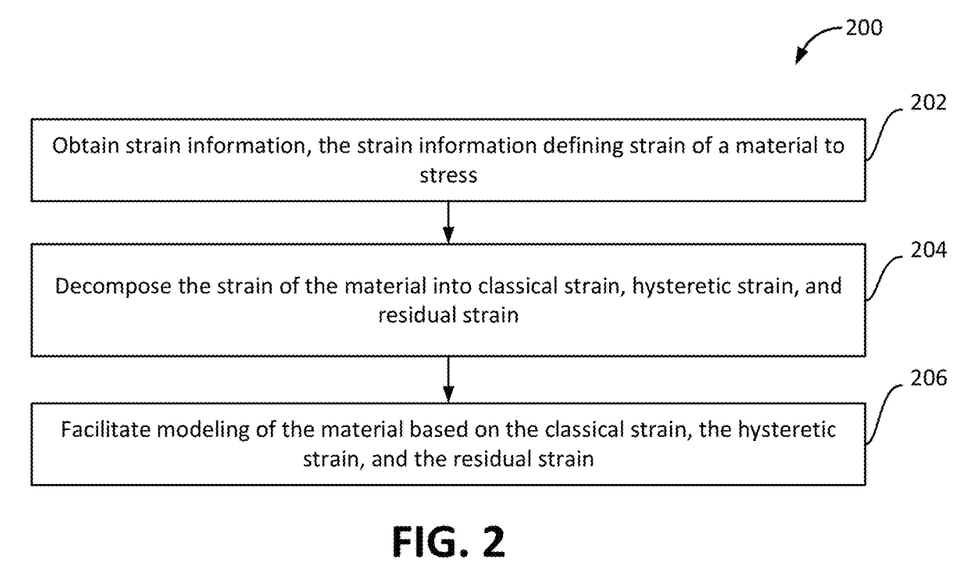
FIG. 2 illustrates an example method for decomposing material strain.

FIG. 2 illustrates method 200 for decomposing material strain. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, strain information and/or other information may be obtained. The strain information may define strain of a material to stress. In some implementations, operation 202 may be performed by a processor component the same as or similar to the strain component 102 (Shown in FIG. 1 and described herein).

At operation 204, the strain of the material may be decomposed into classical strain, hysteretic strain, residual strain, and/or other strain. In some implementations, operation 204 may be performed by a processor component the same as or similar to the decomposition component 104 (Shown in FIG. 1 and described herein).

At operation 206, modeling of the material based on the classical strain, the hysteretic strain, the residual strain, and/or other strain may be facilitated. In some implementations, operation 206 may be performed by a processor component the same as or similar to the model component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for decomposing material strain, the system comprising:
one or more physical processors configured by machine-readable instructions to:
obtain strain information, the strain information defining strain of a rock from a reservoir to stress;
decompose the strain of the rock into classical strain, hysteretic strain, and residual strain, the classical strain including nonlinear, reversible, elastic part of the strain that is reversed when stress is removed from the rock, the residual strain including part of the strain that remains after stress is removed from the rock, wherein decomposition of the strain of the rock into the classical strain, the hysteretic strain, and the residual strain includes:
determination of the residual strain based on closure of a strain loop for the strain of the rock;
determination of the hysteretic strain using a low order Preisach space model; and
determination of the classical strain based on removal of the residual strain and hysteretic strain from the strain of the rock;
perform simulation of reservoir compressibility with depletion based on the classical strain, the hysteretic strain, and the residual strain of the rock, the simulation of reservoir compressibility with depletion simulating changes in stress in the reservoir due to depletion; and
predict hydrocarbon recovery from the reservoir based on the simulation of reservoir compressibility with depletion.

2. The system of claim 1, wherein the strain of the rock to stress includes measurement of change in the strain of the rock to change in stress.

3. The system of claim 2, wherein the change in stress includes one or more cycles of stress increase and stress decrease.

4. The system of claim 1, wherein an effective modulus of elasticity of the rock for the simulation of reservoir compressibility with depletion is determined based on the classical strain, the hysteretic strain, and the residual strain.

5. The system of claim 1, wherein prediction of the hydrocarbon recovery from the reservoir includes determination of estimated ultimate recovery of hydrocarbon from the reservoir over a period of time.

6. The system of claim 1, wherein the simulation of reservoir compressibility with depletion incorporates nonlinear strain response of the reservoir to the changes in stress in the reservoir due to depletion.

7. The system of claim 1, wherein the closure of the strain loop for the strain of the rock includes determination of difference between (1) strain of the rock before stress is applied to the rock and (2) strain of the rock after the stress is applied and removed from the rock.

8. The system of claim 1, wherein model parameters for the low order Preisach space model are identified using a variational principle.

9. The system of claim 1, wherein the decomposition of the strain of the material into the classical strain, the hysteretic strain, and the residual strain further includes representation of the classical strain using a third order polynomial.

10. A method for decomposing material strain, the method comprising:
obtaining strain information, the strain information defining strain of a rock from a reservoir to stress;
decomposing the strain of the rock into classical strain, hysteretic strain, and residual strain, the classical strain including nonlinear, reversible, elastic part of the strain that is reversed when stress is removed from the rock, the residual strain including part of the strain that remains after stress is removed from the rock, wherein decomposing the strain of the rock into the classical strain, the hysteretic strain, and the residual strain includes:
determining the residual strain based on closure of a strain loop for the strain of the rock;
determining the hysteretic strain using a low order Preisach space model; and
determining the classical strain based on removal of the residual strain and hysteretic strain from the strain of the rock;
performing simulation of reservoir compressibility with depletion based on the classical strain, the hysteretic strain, and the residual strain of the rock, the simulation of reservoir compressibility with depletion simulating changes in stress in the reservoir due to depletion; and
predicting hydrocarbon recovery from the reservoir based on the simulation of reservoir compressibility with depletion.

11. The method of claim 10, wherein the strain of the rock to stress includes measurement of change in the strain of the rock to change in stress.

12. The method of claim 11, wherein the change in stress includes one or more cycles of stress increase and stress decrease.

13. The method of claim 10, wherein an effective modulus of elasticity of the rock for the simulation of reservoir compressibility with depletion is determined based on the classical strain, the hysteretic strain, and the residual strain.

14. The method of claim 10, wherein predicting the hydrocarbon recovery from the reservoir includes determining estimated ultimate recovery of hydrocarbon from the reservoir over a period of time.

15. The method of claim 10, wherein the simulation of reservoir compressibility with depletion incorporates nonlinear strain response of the reservoir to the changes in stress in the reservoir due to depletion.

16. The method of claim 10, wherein the closure of the strain loop for the strain of the rock includes determination of difference between (1) strain of the rock before stress is applied to the rock and (2) strain of the rock after the stress is applied and removed from the rock.

17. The method of claim 16, wherein model parameters for the low order Preisach space model are identified using a variational principle.

18. The method of claim 10, wherein decomposing the strain of the material into the classical strain, the hysteretic strain, and the residual strain further includes representing the classical strain using a third order polynomial.

* * * * *

UNITED STATES PATENT AND TRADEMARK OFFICE
CERTIFICATE OF CORRECTION

| | | |
|---|---|---|
| PATENT NO. | : 12,281,552 B2 | Page 1 of 1 |
| APPLICATION NO. | : 17/371566 | |
| DATED | : April 22, 2025 | |
| INVENTOR(S) | : Guyer et al. | |

It is certified that error appears in the above-identified patent and that said Letters Patent is hereby corrected as shown below:

On the Title Page

Item (73) Assignee, Please change "Not Listed" to --Chevron U.S.A. Inc. San Ramon, CA (US); Triad National Security, LLC Los Alamos, NM (US)--.

Signed and Sealed this
Seventeenth Day of June, 2025

Coke Morgan Stewart
*Acting Director of the United States Patent and Trademark Office*